Nov. 10, 1931.  E. J. QUINN  1,831,508
CONVEYING MECHANISM
Original Filed Aug. 16, 1926   2 Sheets-Sheet 1
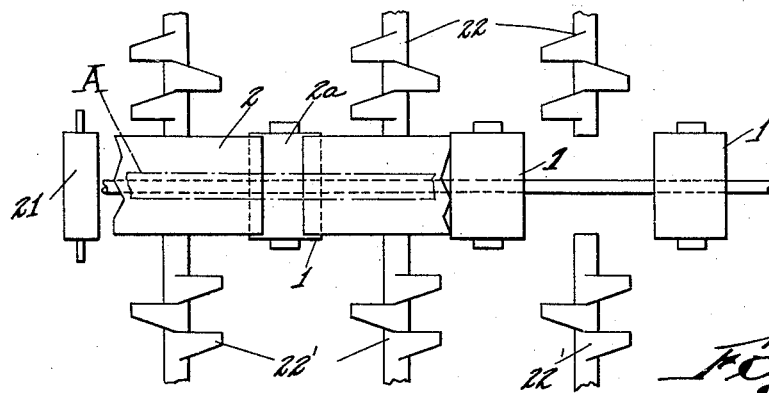
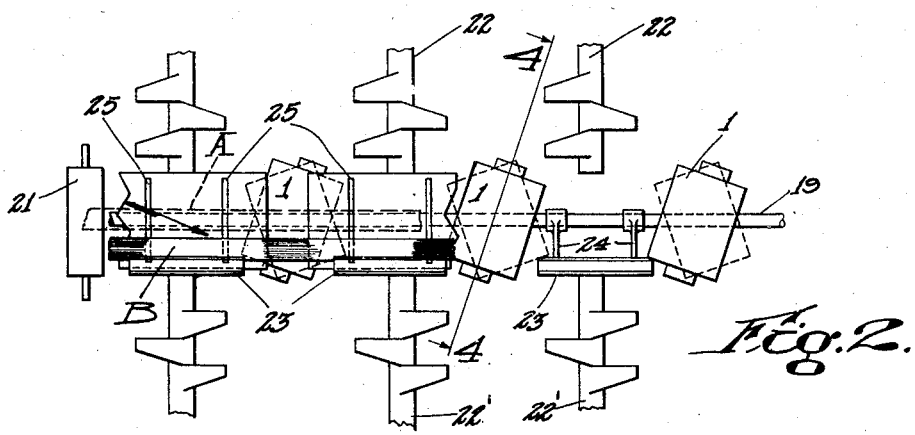
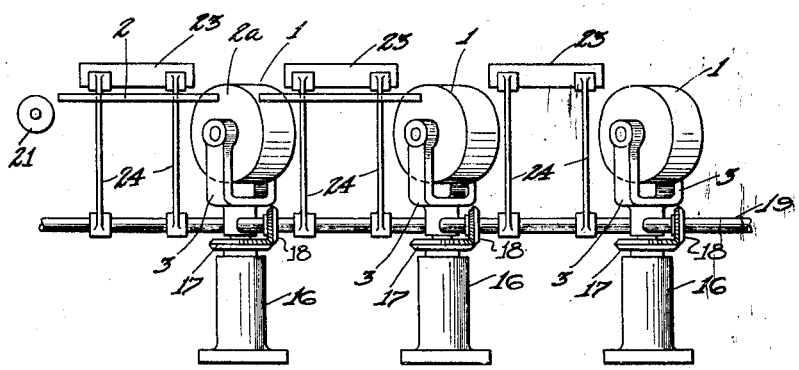

Nov. 10, 1931.  E. J. QUINN  1,831,508

CONVEYING MECHANISM

Original Filed Aug. 16, 1926   2 Sheets-Sheet 2

Inventor:
Edward J. Quinn
By Geo. H. Kennedy Jr.
Attorney

Patented Nov. 10, 1931

1,831,508

UNITED STATES PATENT OFFICE

EDWARD J. QUINN, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

CONVEYING MECHANISM

Continuation of application Serial No. 129,486, filed August 16, 1926. This application filed January 25, 1929. Serial No. 335,063.

This invention, as described in my copending application Serial No. 129,486, filed August 16, 1926, of which the present application is a continuation, relates to conveying mechanism of the type that provides a series of alined rotatable rollers for the support and longitudinal movement of articles or materials to be conveyed, said conveyed material being ordinarily in more or less elongated forms, such for example as lumber or the various rolled products of a steel mill.

According to the invention, and in consequence of the mounting and arrangement of the several conveyor rollers, certain new and highly useful results in the handling and disposition of the conveyed materials are obtained, among others, the ability of the mechanism to procure, when desired, the broadside delivery of the conveyed material from the rollers in either direction, for discharge or removal from the conveyor at any selected point.

As hereinafter described in detail, the invention is particularly applicable to a rolling mill runout, from which it may be desired to discharge the longitudinally conveyed pieces of stock sidewise, and selectively in either direction, onto cooling beds or other receiving devices that flank said runout on opposite sides. Other and further features and advantages of the invention will more fully appear from the following detailed description thereof, taken in connection with the accompanying drawings, in which—

Figs. 1 and 2 are diagrammatic plan views of conveying mechanism of my invention, as applied, for instance, to a rolling mill runout, situated between two oppositely disposed cooling beds or receiving devices.

Fig. 3 is a view in side elevation of the conveying mechanism shown in Fig. 2, the cooling bed parts being omitted.

Like reference characters refer to like parts in the different figures.

Figure 4:
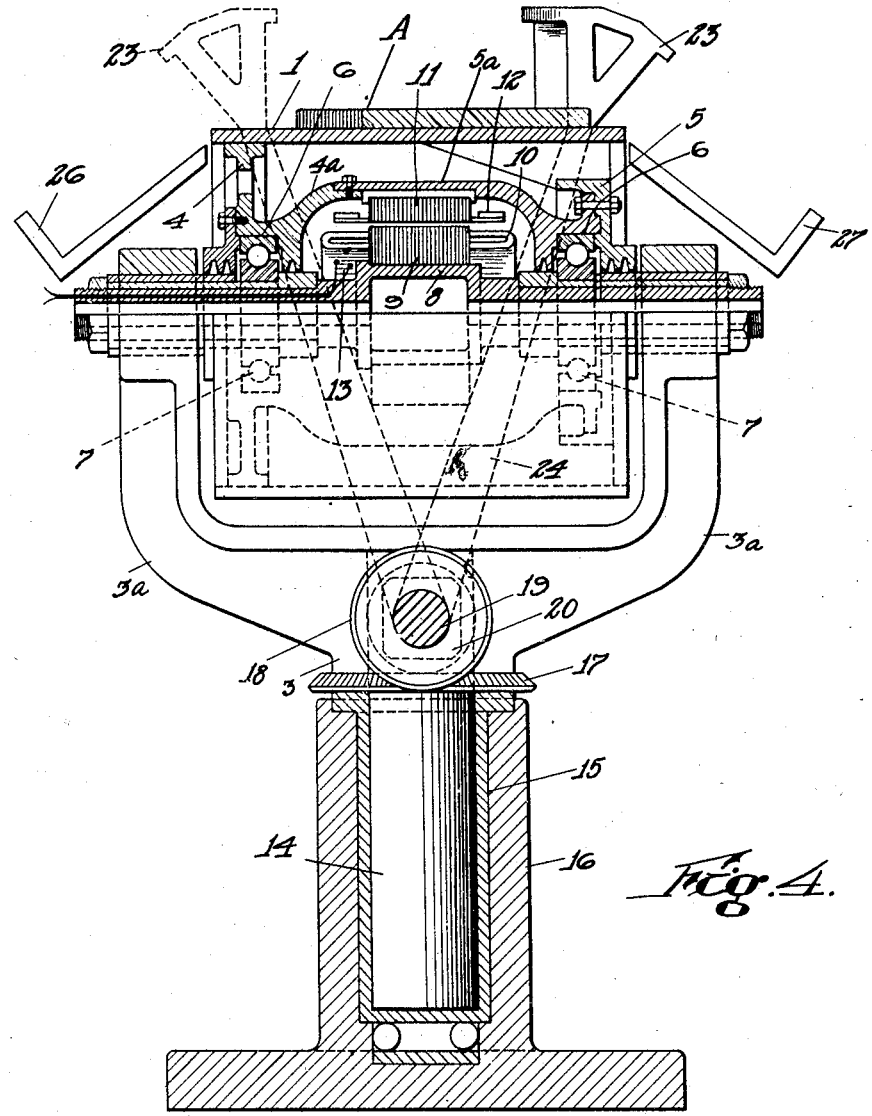
Fig. 4 is a detail sectional view, showing on an enlarged scale one of the roller units of my conveying mechanism, the plane of the section being indicated by the line 4—4 of Fig. 2.

Referring first to Fig. 1, my invention is embodied in a series of alined conveyor rollers 1, 1, which are shown arranged, in the usual manner, with their material-supporting surfaces in a common plane, slightly above a suitably supported floor or platform 2 which has openings 2a, through which the rollers 1, 1 project.

According to the invention, and as best shown in Fig. 3, each roller 1 is mounted, for rotation about its own axis, in a yoke-like supporting member 3, which itself, as hereinafter described, is capable of a certain swinging or turning movement relative to the stationary floor or platform 2 of the conveyor. The axial rotation of each roller 1 may be secured in any well-known manner; for example, as shown in Fig. 4, each roller 1 may have an individual self-contained electric drive, in the form of the well-known type of electric motor wherein the usual relative positions of stator and rotor elements are interchanged.

In such a construction, as shown in Fig. 4, the roller proper, in the form of a hollow cylindrical shell, has at its ends the heads 4 and 5, both of which are suitably recessed, as shown at 6, for the reception of the ball bearings 7, 7, by which the roller 1 is rotatably mounted on a stationary arbor 8,—the latter being supported by and bridging the forked arms 3a, 3a of yoke 3. Extending inwardly from the heads 4 and 5 are the annular meeting flanges 4a and 5a, which inclose a space within the roller 1 to receive an electric driving motor of the above described well-known type, the stator of which is constituted by an annular core 9 secured to the stationary arbor 8 and carrying the primary motor winding 10, and the rotor of which is the surrounding rotatable structure carrying a core 11 and a short-circuited secondary motor winding 12 on the interior wall of the roller. Electric current supplied by leads 13 to the primary winding 10 produces rotation of the above described rotor assembly on its bearings 7, 7; the fact that each roller 1 has its drive within itself, instead of exterior thereto, gives opportunity for the roller axes to assume a variety of positions, in order to secure any desired sidewise movement of the conveyed material, as hereinafter described.

To this end, each supporting yoke 3 has a downwardly extending shaft portion 14, by which said yoke is pivotally mounted, vertically, in a sleeve bearing 15 provided by a stationary post 16,—there being a series of such posts 16 beneath the conveyor for its entire length. Secured to each shaft 14 is a bevel gear 17, each of said gears 17 being in mesh with one of a series of bevel pinions 18, 18 carried by an elongated shaft 19 that extends longitudinally of the conveyor and passes through suitably enlarged openings 20, 20 of the several yokes 3, 3. Said shaft 19, as thus operatively connected to each of the pivotally mounted yokes 3, 3, is adapted to secure, by its angular movement, the skewing in unison of the several rollers 1, 1 in either direction, as desired; Fig. 1 shows said rollers 1, 1 with their axes normal to the direction in which the conveyed material is delivered by the preceding runout rollers 21, 21, and under these conditions, of course, the forward straight line travel of said material as shown at A is maintained on said rollers 1, 1; when the shaft 19 is rocked in one direction, said rollers, 1, 1 are moved in unison into the full line positions shown in Fig. 2, whereupon there is imparted to the conveyed material a combined forward and sidewise movement from position A to position B in Fig. 2,—the continuance of which movement, in the absence of encountering any obstruction, results in the broadside discharge of said material off the ends of the rollers 1, 1. When the shaft 19 is rocked in the opposite direction, to dispose the several rollers 1, 1 in the broken line positions of Fig. 2, the sidewise component of the motion imparted to the conveyed material is towards the other ends of said rollers, for broadside discharge off said ends in the absence of obstruction thereto; in either case, no obstruction is offered by any shafting or driving mechanism for the rollers, because, as described above, I prefer to use rollers with self-contained drives, although my invention, of course, is not limited in this respect.

Figure 5:
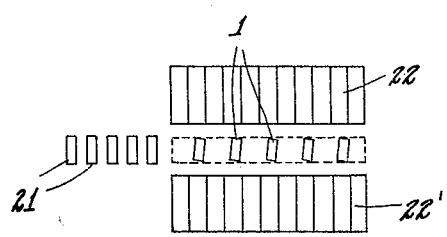
Fig. 5 is a diagrammatic plan view, showing a particular mode of operation of the invention.

An adaptation of my invention, as described above, to procure sidewise discharge of successively delivered rolled pieces, alternately, to a pair of oppositely arranged cooling beds, whose skids are indicated at 22 and 22′, respectively, utilizes, in conjunction with the several pivotally mounted roller units, a guiding means to line up and straighten the conveyed material on the rollers, prior to its sidewise delivery to said cooling beds. Said guiding means is here shown as consisting of a series of members 23, 23, in the nature of side-guards, for insuring alinement of the conveyed material on the rollers 1, 1, and adapted to act also, if desired, as kick-offs, to assist in the broadside discharge of said material, as hereinafter described. For this last purpose, said members 23, 23 may be attached to the shaft 19 by arms 24, 24, the latter passing through transverse slots 25, 25 in the table of platform 2. Said slots are of sufficient length, of course, to permit the shaft 19 to rock freely in either direction, in the act of skewing the rollers 1, 1, as above described. As shown diagrammatically in Fig. 5, the rollers 1, 1 are positioned, for example, in a skewed relation to the line of delivery from the runout rollers 21, 21, whereby the first-delivered piece will be carried sidewise toward the cooling bed 22, until it brings up against the members 23, 23, which, in this position of the rollers 1, 1 stand as obstructions to further broadside movement, as shown in Fig. 2, and also by the full lines in Fig. 4.

The piece, such as A, thus urged sidewise by the skewed rollers 1, 1 against the members 23, 23, is lined up and straightened by this action,—and before the next-delivered piece arrives on said rollers, the shaft 19 is operated to shift the several yokes 3, 3 pivotally, to move said rollers into the broken line positions of Fig. 2. This action, if the angle of skew is sufficient, causes the rollers 1, 1, in forwarding the piece A, to move it clear across the conveyor for discharge sidewise from the ends of said rollers into the first notch 26, Fig. 4, of cooling bed 22′; in any event, the members 23, 23, by their simultaneous movement to the position indicated by broken lines in Fig. 4, will supplement the roller action by pushing against the piece until it drops off the ends of rollers 1, 1 into said first notch 26 of the cooling bed 22′. Inasmuch as the rollers 1, 1 are now skewed oppositely, with reference to their first-described positions, the next piece arriving on said rollers initially moves sidewise toward the cooling bed 22′, until it brings up against the members 23, 23 in the broken line position thereof shown by Fig. 4. Thereupon the shaft 19 is again actuated to simultaneously shift the rollers 1, 1 back to the positions of Fig. 5, and to return the members 23, 23 to full line position, Fig. 4, this last action moving this piece oppositely to the previous piece across the conveyor and dropping it into the first notch 27 of cooling bed 22. And so on, to discharge the successively delivered pieces, alternately, first to one cooling bed, and then to the other cooling bed.

I claim,

1. In a conveying mechanism, the combination with a series of obliquely arranged rollers adapted by their rotation to cause combined longitudinal and broadside movement of material thereon, of a series of members for limiting broadside movement of the material across the rollers in either direction, and means for moving said members to cause broadside removal of a piece of material from the rollers in one direction, said broadside removal being accompanied by a reversal of the obliquity of said rolls preparatory to broadside movement of the next succeeding piece of material in the opposite direction.

2. In a conveying mechanism, the combination with a series of obliquely arranged rollers adapted by their rotation to cause combined longitudinal and broadside movement of material thereon, of a series of members for limiting the broadside movement of the material across the rollers in either direction, and means for reversing the obliquity of said rollers and the position of said members to cause the material to run out on said rollers in broadside engagement with said members on either side as selected.

3. In a conveying mechanism, the combination with a series of obliquely arranged rollers adapted by their rotation to cause combined longitudinal and broadside movement of material thereon, of a series of members for limiting the broadside movement of the material on the rollers, means for operating said members to cause broadside removal of a piece of material from the rollers by said members, and means responsive to the operation of said members for procuring a reversal of the obliquity of said rollers to cause broadside engagement of the material with said members in their new position.

4. In a conveying mechanism, the combination with a series of rollers adapted for rotation on horizontal axes and for pivotal movement on vertical axes, whereby to cause combined longitudinal and broadside movement of material on said rolls, and a series of pivotally mounted members disposed between said rollers for limiting broadside movement of the material on the rollers, of means for turning said members to cause broadside removal of a piece of material from said rollers, and an operative connection between said members and said rollers for simultaneously turning said rollers on their pivotal axes to cause the next succeeding piece of material to be moved across the rollers into broadside engagement with said members in their new position.

5. Conveying mechanism of the class described, comprising a series of alined rotatable rollers for the support and longitudinal movement of the material to be conveyed, a mounting for each roller, said mounting adapted to pivot on a vertical axis which intersects the roller axis substantially at its center, and means for pivotally shifting said mountings in unison, selectively in either direction, thereby to skew the roller axes so as to effect broadside delivery of the conveyed material off the ends of said rollers.

6. Conveying mechanism of the class described, comprising a series of alined rotatable rollers for the support and longitudinal movement of the material to be conveyed, guiding means for said material, said guiding means extending in the direction of the longitudinal movement of said material on said rollers, and means for skewing said rollers, first in one direction and then in the other, to carry the material into sidewise engagement, first with one side of said guiding means and then with the opposite side of said guiding means.

7. The combination with a series of alined rotatable conveyor rollers, of receiving devices for the conveyed material at opposite ends of said rollers, guiding means associated with said rollers and engaged on one side by the conveyed material when the several roller axes are skewed in one direction, and means for reversing the skew of said roller axes, to procure sidewise discharge of the material thereon to one of said receiving devices, and the movement of subsequent material received thereon into engagement with the opposite side of said guiding means.

8. The combination with a series of alined rotatable conveyor rollers, of guiding means associated with said rollers and engaged on one side by the conveyed material when the several roller axes are skewed in one direction, and means for reversing the skew of said roller axes, to procure sidewise delivery of the material thereon from said rollers at one end, and the sidewise movement of subsequent material received thereon into engagement with the opposite side of said guiding means.

EDWARD J. QUINN.